G. STORER.
BASKET MACHINE.
No. 62,085. Patented Feb. 12, 1867.
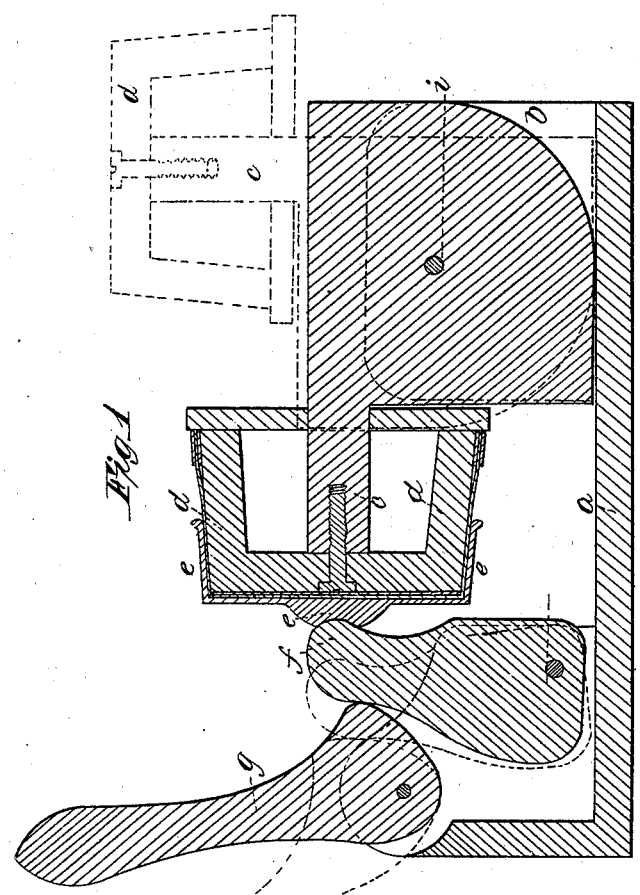
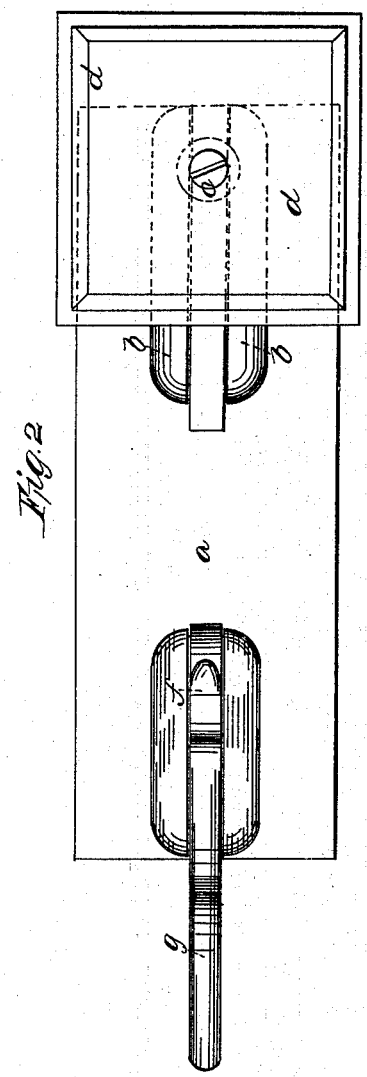
Witnesses
Chas H Smith
Geo. D. Walker
Inventor
George Storer
per L. W. Sewell Atty

United States Patent Office.

GEORGE STORER, OF NEW BRITAIN, CONNECTICUT.

Letters Patent No. 62,085, dated February 12, 1867.

IMPROVEMENT IN BASKET MACHINES.

*The Schedule referred to in these Letters Patent and making part of the same.*

TO ALL WHOM IT MAY CONCERN:

Be it known that I, GEORGE STORER, of New Britain, in the county of Hartford, and State of Connecticut, have invented, made, and applied to use a certain new and useful Improvement in Basket Machinery; and I do hereby declare the following to be a full, clear, and exact description of the said invention, reference being had to the annexed drawing, making part of this specification, wherein—

Figure 1 is a longitudinal section of the said machine as in use for making a basket; and Figure 2 is a plan of the same, with the basket mould in a position for receiving the splints.

Similar marks of reference denote the same parts.

The small baskets usually employed for receiving berries have been made by tacking together two splints or thin layers of wood, placed at right angles upon each other, and then bending them up in a machine by folders or dies. This mode of manufacture involves considerable machinery, and some of it is liable to injury by use.

The nature of my said invention consists in a combined anvil and mould-block, attached by a movable gudgeon, so that the mould may be rotated, and may also be turned down so that its gudgeon is horizontal, or turned up vertically, so as to form an anvil, upon which the splints are laid at right angles, or across each other, while being nailed together; and then a clamping cap is placed over the splints, to hold the sides of the basket in place while being tacked to a rim. My machine is light, strong, and simple, and greatly facilitates the manufacture of the baskets.

In the drawing $a$ is a bed-plate, upon which are two flanges, $b$, between which is the stock $m$ of the gudgeon $c$. This is kept in place by a pin, $i$, that also forms a centre upon which it may be turned up vertically, or turned down horizontally. This gudgeon carries the metallic mould-block $d$, forming also an anvil. The block $d$ is attached to the end of the gudgeon $c$ by a flat-headed bolt or nuts, so that the surface of the anvil-mould may be flat, or nearly so, but at the same time said mould is free to be turned around upon the gudgeon.

When in the position shown in fig. 2, and by red lines in fig. 1, the mould-block $d$ becomes an anvil, upon which the splints are laid across each other, and united by tacks driven in and clinched against the anvil. The clamping cap $e$ is then pressed over the splints, to turn them down against the sides of the mould. The mould is then brought down horizontal, and the cap $e$ clamped by the moving centre $f$, that takes into a hole or cavity in the cap $e$, so that the basket is held in place but the mould is free to be rotated while the bands are being secured to the edges of the basket by tacks driven in and clinched against the anvil. The basket is then removed by releasing the centre $f$, turning up the mould $d$, and lifting off the cap $e$. The centre $f$ may be moved by any suitable means. I have, however, shown it as swinging upon the centre $o$ and acted upon by the lever cam $g$.

What I claim, and desire to secure by Letters Patent, is—

1. The gudgeon $c$, extending from the stock $m$, and turning upon the pin $i$, in combination with the mould-block $d$, as specified, so that the said gudgeon $c$ will be sustained by its stock in a horizontal or vertical position, for the purposes set forth.

2. I claim the mould-block, fitted so as to be revolved, in combination with the clamping cap $e$ and movable centre $f$, substantially as and for the purposes specified.

In witness whereof I have hereunto set my signature this 9th day of November, A. D. 1866.

GEORGE STORER.

Witnesses:
HENRY NASH,
FRANK B. HARRIS.